United States Patent [19]
Kubo

[11] Patent Number: 5,164,964
[45] Date of Patent: Nov. 17, 1992

[54] DIVERSITY CIRCUIT AND FRAME PHASE (OR SAMPLING TIMING) ESTIMATION CIRCUIT USING THE DIVERSITY CIRCUIT

[75] Inventor: Hiroshi Kubo, Kanagawa, Japan

[73] Assignee: Mitsubishi Denki Kabushiki Kaisha, Japan

[21] Appl. No.: 667,457

[22] Filed: Mar. 11, 1991

[30] Foreign Application Priority Data

Mar. 20, 1990 [JP] Japan ................................. 2-70557

[51] Int. Cl.⁵ ............................................. H04B 7/10
[52] U.S. Cl. ..................................... 375/100; 455/135
[58] Field of Search ................... 375/40, 79, 47, 100, 375/101; 455/132, 135, 139, 272, 273, 275, 276

[56] References Cited

U.S. PATENT DOCUMENTS

| | | | |
|---|---|---|---|
| 4,715,048 | 12/1987 | Masamura | 375/100 |
| 4,935,940 | 6/1990 | Reindl | 375/100 |
| 4,972,423 | 11/1990 | Le Polozec et al. | 455/139 |
| 5,031,193 | 7/1991 | Atkinson et al. | 375/100 |

OTHER PUBLICATIONS

Aria et al., "Design & Performance of Synchronization Techniques and Viterbi, Adaptive Equalizers for Narrow Band TDMA Mobile Radio".

Kazuhiro, "A New Post-Detection Selection Diversity with MLSE Equalization", Automnal National Session of the Institute of Electronics, Information & Communication Engineer, 1989, B502, pp. 2-172.

Primary Examiner—Stephen Chin
Attorney, Agent, or Firm—Wolf, Greenfield & Sacks

[57] ABSTRACT

A diversity circuit is disclosed which includes CIR estimation circuits, error computers for computing the ratios of the estimated CIR power to the error power between the estimated and actual received signal for respective received signals, a comparator for comparing respective ratios, and a selector for outputting the received signal and the CIR corresponding to the maximum power ratio. A frame phase (or sampling timing) estimation circuit using the diversity circuit further includes a delay circuit for providing a received signal with different delays, whereby the selector outputs the delayed received signal and the CIR corresponding to the maximum power ratio.

14 Claims, 6 Drawing Sheets

DIVERSITY CIRCUIT AND FRAME PHASE (OR SAMPLING TIMING) ESTIMATION CIRCUIT USING THE DIVERSITY CIRCUIT

BACKGROUND OF THE INVENTION

1. Field of the Invention

The present invention relates to a diversity circuit and a frame phase (or sampling timing) estimation circuit which uses the diversity circuit, in digital radio communication.

2. Prior Art

Figure 1:
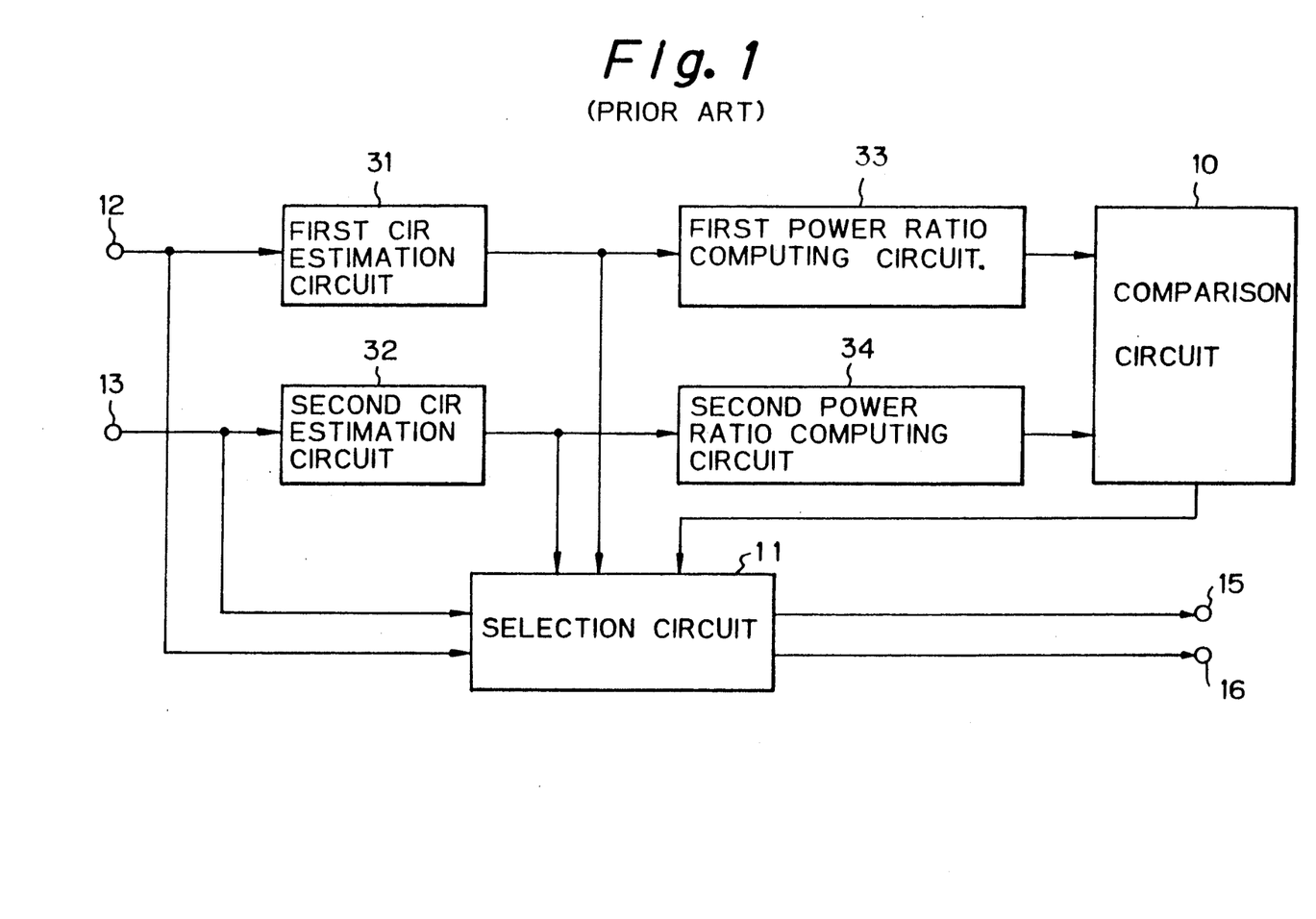
FIG. 1 is a block diagram showing a diversity circuit according to a prior art.

FIG. 1 is a block diagram illustrating a prior art diversity circuit such as the one disclosed in the literature titled "A New Post-detection Selection Diversity with MLSE (Maximum Likelihood Sequence Estimation) Equalization" (Autumnal National Session of the Institute of Electronics, Information and Communication Engineers, 1989, B-502, pp. 2-172). In FIG. 1, numeral 10 designates a comparison circuit adapted to compare a power ratio, numeral 11 a selection circuit adapted to output the optimum received signal and an estimated value of the channel characteristics such as an estimated channel impulse response (CIR) respectively to output terminal 15 for the selected received signal and output terminal 16 for the selected estimated CIR value, numerals 31, 32 respectively a first CIR estimation circuit and a second CIR estimation circuit adapted to estimate CIR on the basis of the received signals input to the input terminals 12, 13 and a transmission pattern which is known, and numerals 33, 34 respectively a first power ratio computing circuit and a second power ratio computing circuit adapted to obtain the power ratio of the estimated CIR.

Figure 2:
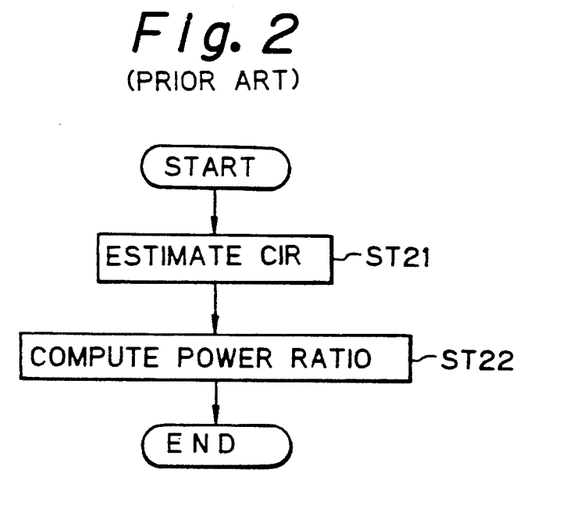
FIG. 2 is a flow chart illustrating an operation of a CIR estimation circuit and a power ratio computing circuit according to a prior art.

Operation of the diversity circuit will next be explained by referring to a flow chart shown in FIG. 2. The signals which have been received by antennas (not shown) installed at different locations spaced from each other are detected by respective detection circuits (not shown) and then input to the input terminals 12, 13 as the received signals. The first CIR estimation circuit 31 and the second CIR estimation circuit 32 receive the respective received signals and compute estimated CIR values for the respective input systems and output the computed values (Step ST21). Then the first power ratio computing circuit 33 and the second power ratio computing circuit 34 are adapted to receive the respective estimated CIR values and compute the ratio of the power component to be used in the maximum likelihood sequence estimation (MLSE) section at the later stage (not shown) (i.e., the power within the processing range) relative to the power out of the range of MLSE equalization (i.e., the power out of the processing range) (Step ST22). The comparison circuit 10 is adapted to receive the respective power ratios and output a selected signal designating the received signal which corresponds to the largest power ratio or the received signal which is supposed to have the largest equivalent S/N ratio. The selection circuit 11 is then adapted to output the received signal and the estimated CIR value corresponding to the selection signal.

Figure 3A:
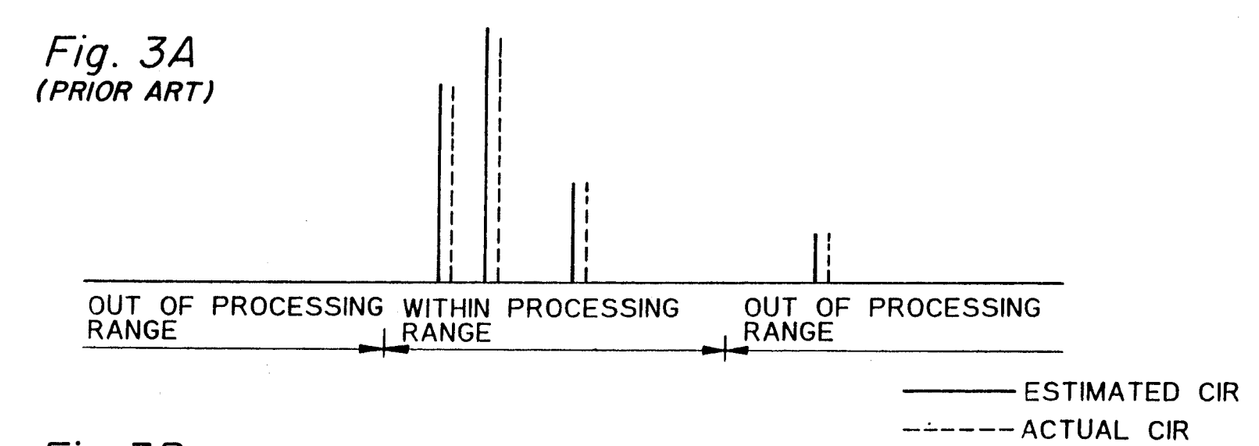
Figure 3B:
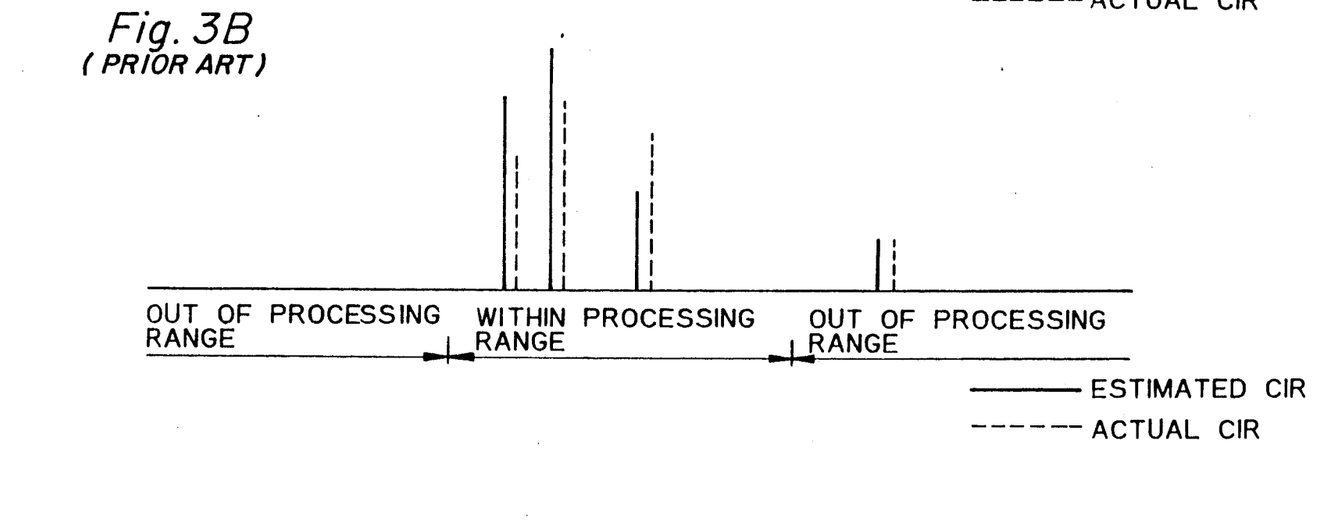

FIG. 3 is an explanatory diagram showing an example of the relationship between the estimated CIR and the actual CIR. In FIG. 3, the solid line designates the estimated CIR while the dotted line designates the actual CIR. In the case as illustrated by FIG. 3A, the power ratios of the CIR power within the processing range relative to the CIR power out of the processing range are computed and the power ratio designating that the power is most concentrated in the processing range is selected. Here consideration is made in respect of the case that the estimated CIR values for the received signals input to the two input terminals 12, 13 have exactly the same values but only the noise power respectively corresponding to these received signals are different from one another. In this case, the received signal corresponding to the smaller noise power should be selected. However, according to the comparison method of power ratios in the diversity circuit as above explained, the probability of such a selection being made is 0.5. Another consideration is also made in the case in which the estimated CIR values for the received signals are exactly the same but the relationship between the estimated CIR values and the actual CIR values are respectively as illustrated by FIGS. 3A and 3B. In this case, the received signal corresponding to the smaller error in CIR estimation shown in FIG. 3A should be selected, but the probability of such a selection being made 0.5.

Since the prior art diversity circuit does not consider the noise power and CIR estimation error upon selection of the received signal, proper selection is often not made when the noise power and CIR estimation error are considerable.

SUMMARY OF THE INVENTION

The present invention is directed to eliminate the problem as mentioned above and an object of the present invention is to provide a diversity circuit capable of selecting a proper received signal even when the noise power and CIR estimation errors are considerable and a frame phase (or sampling timing) estimation circuit using the diversity circuit.

To achieve this object, a diversity circuit having a plurality of input terminals and receiving at the respective input terminals respective received signals which have been propagated through different signal paths, according to the present invention, comprises transmission channel characteristic (or channel impulse response, CIR) estimation circuits provided to correspond to said plurality of input terminals, each of said transmission channel characteristic estimation circuits estimating the transmission channel characteristics of each signal path on the basis of each of said received signals to output the estimation value of the transmission channel characteristics; error computing circuits provided to correspond to said respective transmission channel characteristic estimation circuits, each of said error computing circuits computing the power of the estimated characteristics of the transmission channel on the basis of said estimated value which is output from the corresponding transmission channel characteristic estimation circuit, and estimating a received signal on the basis of said corresponding estimated value and the transmission pattern which is known in advance, to compute the power ratio of the power of said estimated characteristics of the transmission channel to the corresponding error power of the difference between of the estimated received signal and of said received signal; a comparison circuit for comparing the respective power ratios respectively output from said error computing circuits, to output the selection signal designating the signal path corresponding to the maximum power ratio; and a selection circuit for outputting the received signal and the estimation value of the transmission channel, which corresponds to said signal path designated by said relation signal, from said respective received signals and said respective estimation values of the transmission channel characteristics.

Also, to achieve the aforementioned object, a frame phase (or sampling timing) estimation circuit according to the present invention comprises, at the front stage of the circuit which is identical to the diversity circuit as described above, a delay circuit for providing a received signal with a plurality of different delays to output a plurality of different delayed received signals to transmission channel characteristic estimation circuits of said diversity circuit, whereby the respective delayed received signals are treated as respective received signals in said diversity circuit.

The error computing circuit according to the present invention computes the estimated CIR power from the estimated CIR value, for example by calculating the squared value of the estimated CIR value, estimates a received signal based on the estimated CIR value and the known transmission pattern, computes the error power of the difference between the actual received signal and the estimated received signal, and computes the power ratio of the estimated CIR power to the error power to output this power ratio which has taken the noise power and CIR estimation error into consideration for each received signal.

These and other objects and advantages will become clear by reading the following description of the invention with reference to the accompanied drawings.

BRIEF DESCRIPTION OF THE DRAWINGS

FIG. 3 with A & B are waveforms illustrating the relationships between the estimated CIR values and the actual CIR values;

FIG. 7 with A and B are waveforms showing the relationships between the estimated CIR values and the actual CIR values.

DETAILED DESCRIPTION OF THE PREFERRED EMBODIMENTS

Figure 4:
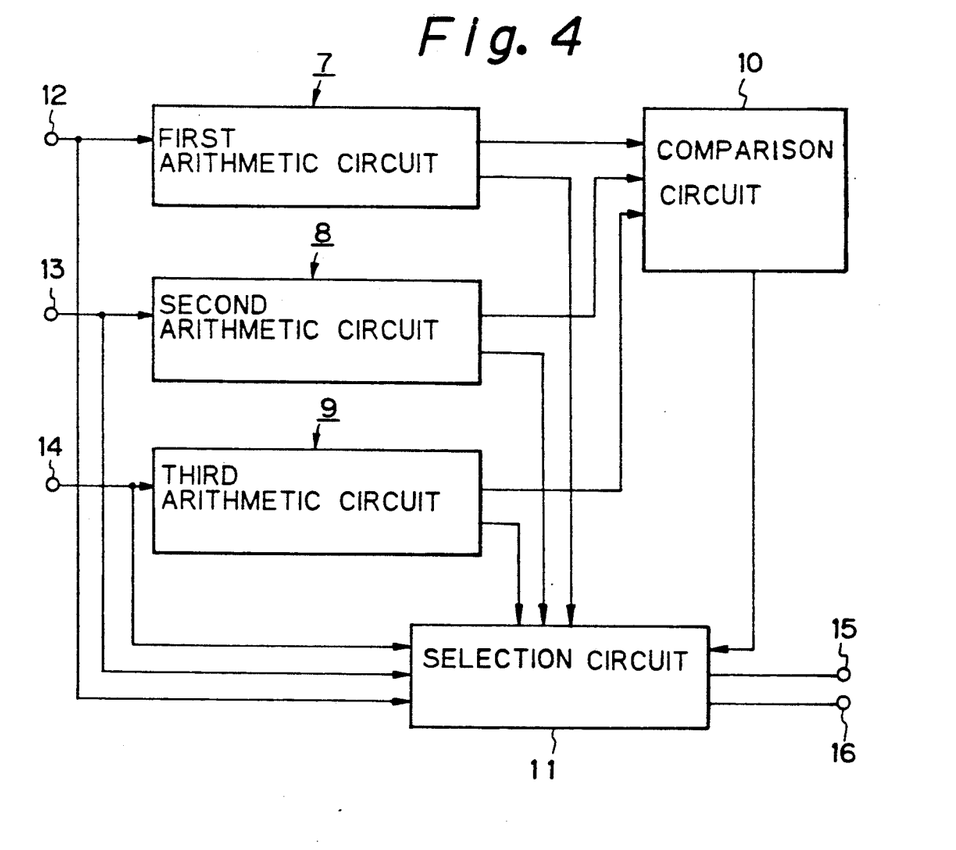
FIG. 4 is a block diagram showing a diversity circuit according to an embodiment of the present invention.
Figure 5:
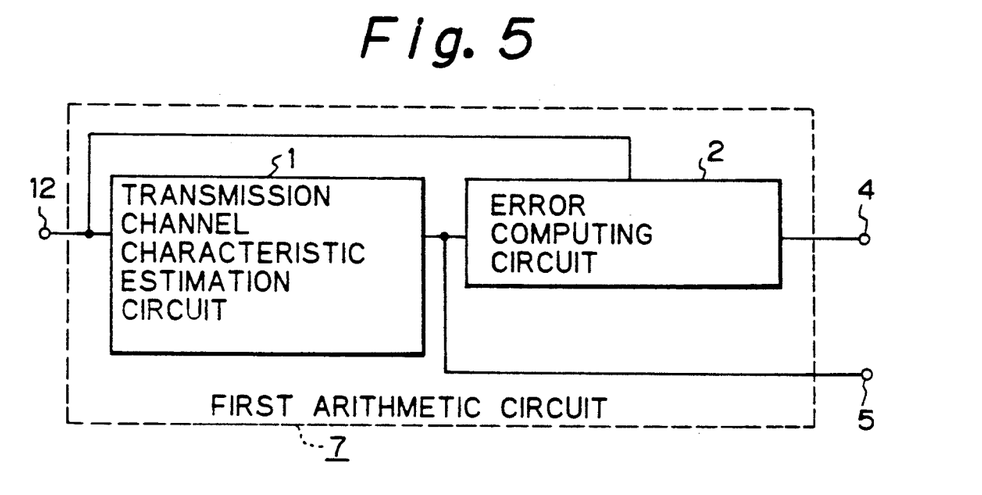
FIG. 5 is a block diagram showing a constitution of one of the arithmetic circuits shown in FIG. 4.
Figure 6:
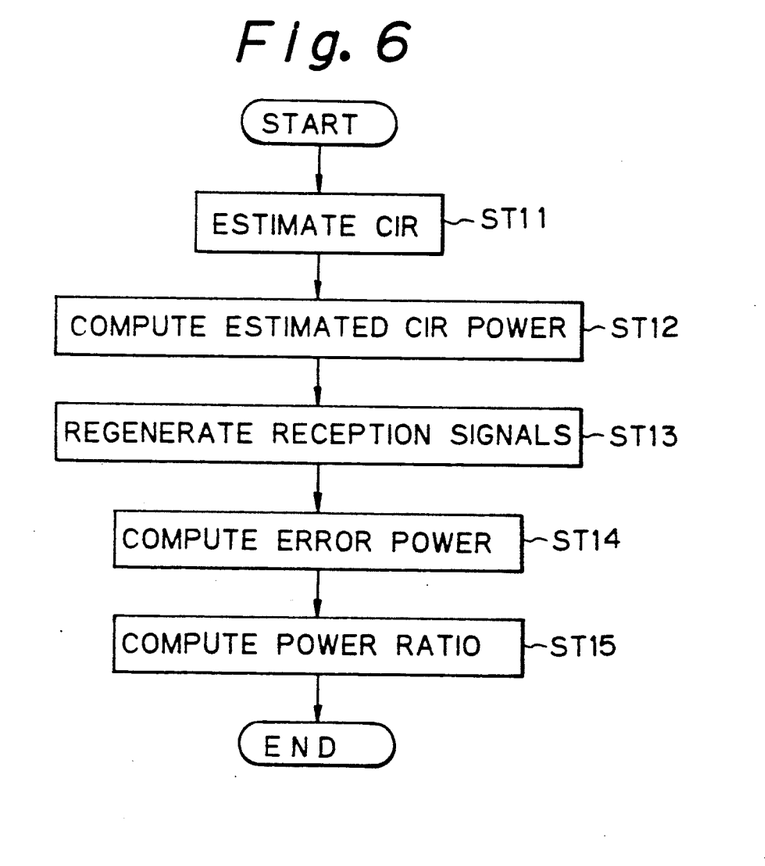
FIG. 6 is a flow chart illustrating an operation of the arithmetic circuit shown in FIG. 5.

An embodiment of the present invention will now be explained by referring to the drawings. In FIG. 4, numerals 7, 8, 9 designate respectively a first arithmetic circuit, a second arithmetic circuit and a third arithmetic circuit which are adapted to output the estimated channel impulse response (CIR) value, and the power ratio of the estimated CIR power relative to the error power. The rest of the elements in FIG. 4 are generally the same as those designated by the same numerals as those in FIG. 1. FIG. 5 is a block diagram illustrating the constitution of the first arithmetic circuit 7. In FIG. 5, numeral 1 designates a transmission channel characteristic estimation circuit adapted to output such estimated transmission channel characteristic as estimated CIR values to an output terminal 5 and an error computing circuit 2 which outputs the power ratio to an output terminal 4. It is to be noted that the constitution of the second arithmetic circuit 8 and the third arithmetic circuit 9 is identical to that of the arithmetic circuit shown in FIG. 5. FIG. 6 is a flow chart illustrating an operation of the respective arithmetic circuits 7, 8, 9.

Operation of the present apparatus will next be explained by referring to the flow chart in FIG. 6. The CIR estimation circuit 1 of the first arithmetic circuit 7 estimates the CIR on the basis of the received signal input to the input terminal 12 in the conventional manner and outputs the estimated CIR value (Step ST11). Next, the error computing circuit 2 calculates the squared value of the estimated CIR value as the estimated CIR power (Step ST12). Received signals are estimated on the basis of the actual received signals and the known transmission pattern such as preambles of frames (Step ST13). The squared value (i.e. the error power) of the error (i.e. the difference) between the actual received signal and the estimated received signal is computed as error power (Step ST14). The power ratio of the estimated CIR power relative to the error power is computed (Step ST15). This power ratio is then output to the comparison circuit 10 via the output terminal 4. The second arithmetic circuit 8 and the third arithmetic circuit 9 also receive the received signals at the respective input terminals 13, 14 and output the power ratio and estimated CIR value respectively by a similar operation to that of the first arithmetic circuit 7.

The comparison circuit 10 is adapted to compare the respective power ratios and output to the selection circuit 11 the selection signal specifying the received signal corresponding to the largest power ratio. The selection circuit 11, in turn, selects the received signal specified by said selection signal, and the estimated CIR value acquired from this received signal and outputs them to the output terminals 15, 16.

Figure 7A:
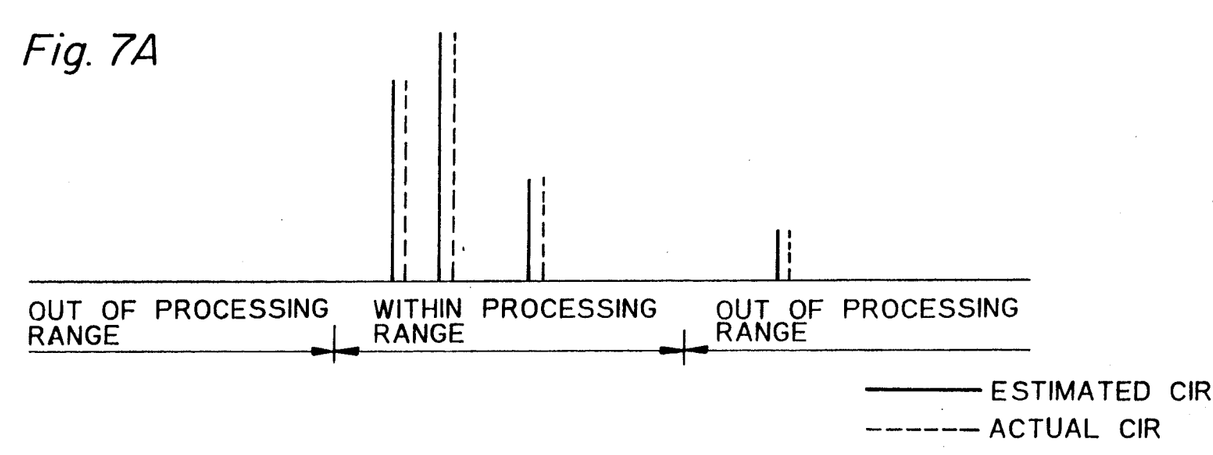
Figure 7B:
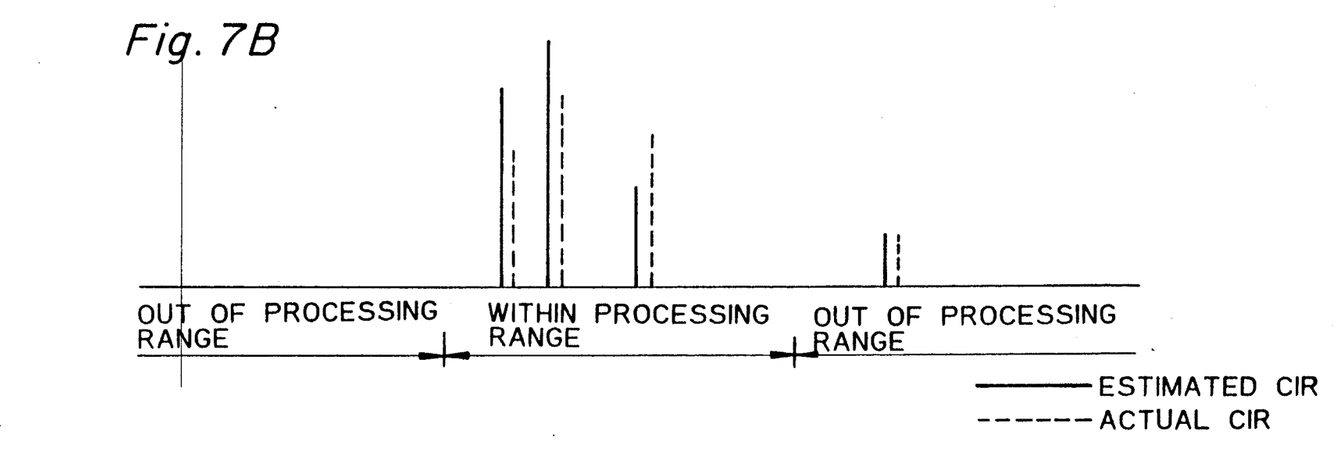

FIG. 7 illustrates an example of the relationship between the estimated CIR and the actual CIR. In the case as illustrated by symbol (A) of FIG. 7 according to operation of the above-described diversity circuit, CIR within the processing range alone becomes the estimated CIR and CIR out of the processing range contributes to the error power. Considered here is the case in which estimated CIR values for the received signals input to the two input terminals 12, 13 are exactly equal but the noise powers related to these received signals are different each other. In this case, the received signal corresponding to the smaller error power should be selected, thus the received signal having a small noise power is selected. Next considered is the case wherein estimated CIR values are exactly equal, but the relationships between the estimated CIR values and the actual CIR values are respectively as shown by FIGS. 7A-B. In this case, since the error power between the estimated CIR and the actual CIR in the case of FIG. 7A is smaller than that in the case of FIG. 7B, the received signal corresponding to the case of FIG. 7A is also selected.

Figure 8:
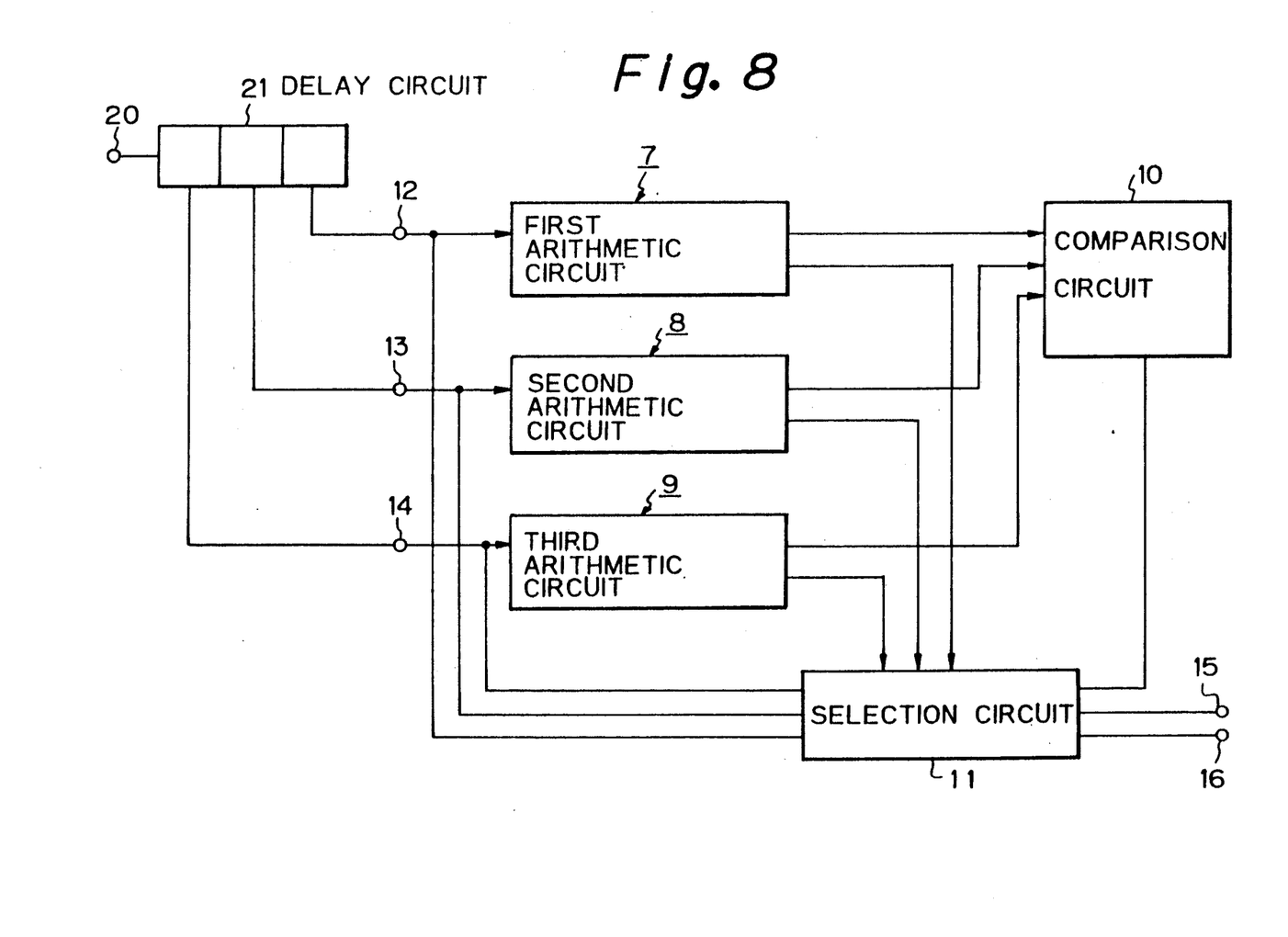
FIG. 8 is a block diagram showing a frame phase (or sampling timing) estimation circuit using the diversity circuit shown in FIG. 4, according to an embodiment of the present invention.

FIG. 8 is a block diagram showing a frame phase (sampling timing) estimation circuit according to an embodiment of the present invention. In FIG. 8, numeral 20 designates an input terminal for the received signals, numeral 21 designates a delay circuit such as a shift register adapted to provide received signals with sequential delays and the other elements are the same as those shown in FIG. 4. In this instance, the delayed received signals output from the respective taps of the delay circuit 21 are input to the input terminals 12, 13, 14. It is to be noted here that the delayed received signal input to the input terminal 13 is delayed by ΔT from the received signal input to the input terminal 14 and the delayed received signal input to the input terminal 12 is delayed by 2ΔT from the received signal input to the input terminal 14. As the delay ΔT, the inverse of the symbol rate of the signal to be transmitted is established. The respective arithmetic circuits 7, 8, 9, and the selection circuit 11, which have respectively input the respective delayed received signals, and the comparison circuit 10 are caused to operate in a manner similar to that of the apparatus shown in FIG. 4 and output the received signal having an optimum delay and the estimated CIR value to the output terminals 15, 16. Thus, if the circuit provided at the later stage (not shown) could demodulate the selected delayed received signal, then receiving can be carried out from the top of the frame.

Although the respective embodiments as described above had three input terminals 12, 13, 14, the number of said input terminals can be increased. If the input terminals are increased, then the effect of diversity can be enhanced and the estimation range of the top phase of a frame can be further extended.

Since the present invention has been so constituted that the diversity circuit and the frame phase (sampling timing) estimation circuit using the diversity circuit are adapted to estimate the input signals from estimated CIR values, and select the optimum input signal by using the power ratio of the estimated CIR power relative to the error power between the estimated input signals and the actual input signals, even if the noise power and CIR estimation error are considerable, the proper input signal may be selected.

The present invention has been described in detail with reference to certain preferred embodiments thereof, but it will be understood that variations and modifications can be effected within the spirit and scope of the invention.

What is claimed is:

1. A diversity circuit having a plurality of input terminals and receiving at the respective input terminals respective received signals which have been propagated through different signal paths, said diversity circuit comprising:
   a transmission channel characteristic estimation circuit provided for each of said input terminals, each of said transmission channel characteristic estimation circuits estimating the characteristics of the transmisison channel of the signal path corresponding to the input terminal on the basis of the corresponding received signal to output the estimated value of the transmission channel characteristics;
   an error computing circuit provided for each of said respective transmission channel characteristic estimation circuits, each of said error computing circuits computing the power of the estimated transmission channel characteristics on the basis of said estimated value which is output from the corresponding transmission channel characteristic estimation circuit, and estimating a received signal on the basis of said corresponding estimated value and a predetermined transmission pattern, to compute a power ratio of the power of said estimated transmission channel characteristics to a corresponding error power of the difference between the estimated received signal difference between the estimated received signal and said received signal;
   a comparison circuit for comparing the power ratios output from said error computing circuits, to output a selection signal designating the signal path corresponding to the maximum power ratio; and
   a selection circuit for outputting the received signal and the estimated value of the transmission channel, which correspond to said signal path designated by said selection signal.

2. A diversity circuit for receiving a plurality of received signals which have been propagated through a plurality of different signal paths and for selecting an optimum received signal, said diversity circuit comprising:
   transmission channel characteristic estimation means for computing the estimated value of the transmission channel characteristics representing the estimated characteristics of the transmission channel of the signal path on the basis of the received signal, for each of said plurality of received signals;
   means for computing the power of the estimated transmission channel characteristics on the basis of said estimated value for each received signal;
   means for estimating a received signal on the basis of said estimated value and a predetermined transmission pattern, for each received signal;
   means for computing the error power of the difference between the estimated received signal and said corresponding received signal for each received signal;
   means for computing the power ratio of said power of the estimated transmission channel characteristics to said corresponding error power for each received signal; and
   means for comparing respective power ratios and for selecting and outputting the received signal corresponding to the maximum power ratio.

3. A diversity circuit as defined in claim 2, wherein said means for selecting and outputting the received signal corresponding to the maximum power ratio further selects and outputs the estimated value of the transmission channel corresponding to the maximum power ratio.

4. A diversity circuit as defined in claim 2, wherein said transmission channel characteristics comprise a channel impulse response.

5. A diversity circuit as defined in claim 2, wherein said transmission channel characteristic estimation means, said means for computing the power of the estimated transmission channel characteristics, said means for estimating a received signal, said means for computing the error power, and said means for computing the power ratio operate on said received signals in parallel.

6. A frame phase (or sampling timing) estimation circuit using a diversity circuit, comprising:
   a delay circuit for providing a received signal with a plurality of different delays to output a plurality of differently delayed received signals,
   said diversity circuit including:
   a transmission channel characteristic estimation circuit provided for each of said differently delayed received signals, each of said transmission channel characteristic estimation circuits estimating the transmission channel characteristics on the basis of said plurality of differently delayed received signals to output the estimated value of the transmission channel characteristics;

an error computing circuit provided for each of said respective transmission channel characteristic estimation circuits, each of said error computing circuits computing the power of the estimated transmission channel characteristics on the basis of said estimated value which is output from the corresponding transmission channel characteristic estimation circuit, and estimating a received signal on the basis of said corresponding estimated value and a predetermined transmission pattern, to compute a power ratio of the power of said estimated transmission channel characteristics to a corresponding error power of the difference between the estimated received signal and said received signal;

a comparison circuit for comparing the power ratios output from said error computing circuits, to output a selection signal designating the delay corresponding to the maximum power ratio; and a selection circuit for outputting the delayed received signal and the estimated value of the transmission channel, which correspond to said delay designated by said selection signal.

7. A frame phase (or sampling timing) estimation circuit using a diversity circuit, comprising:

a delay circuit for providing a received signal with a plurality of different delays to output a plurality of differently delayed received signals, said diversity circuit including:

transmission channel characteristic estimation means for computing the estimated value of the transmission channel characteristics on the basis of each of said plurality of differently delayed received signals;

means for computing the power of the estimated transmission channel characteristics on the basis of said estimated value for each differently delayed received signal;

means for estimating a received signal on the basis of said estimated value and a predetermined transmission pattern, for each differently delayed received signal;

means for computing the error power of the difference between the estimated received signal and said corresponding delayed received signal for each differently delayed received signal;

means for computing the power ratio of said power of the estimated transmission channel characteristics to said corresponding error power for each differently delayed received signal; and means for comparing respective power ratios and for selecting and outputting the received signal corresponding to the maximum power ratio.

8. A frame phase (or sampling timing) estimation circuit as defined in claim 7, wherein said means for selecting and outputting the received signal corresponding to the maximum power ratio further selects and outputs the estimated value of the transmission channel corresponding to the maximum power ratio.

9. A frame phase (or sampling timing) estimation circuit as defined in claim 7, wherein said transmission channel characteristics comprise a channel impulse response.

10. A frame phase (or sampling timing) estimation circuit as defined in claim 7, wherein said transmission channel characteristic estimation means, said means for computing the power of the estimated transmission channel characteristics, said means for estimating a received signal, said means for computing the error power, and said means for computing the power ratio operate on said received signals in parallel.

11. A diversity circuit having a plurality of input terminals, each input terminal for receiving a respective received signal propagated through a corresponding signal path, said diversity circuit comprising:

for each input terminal, a transmission channel characteristic estimation circuit for estimating the characteristics of the transmission channel of the corresponding signal path on the basis of the respective received signal;

for each input terminal, an error computing circuit for computing the power of said characteristics of the transmission channel, and for estimating a received signal on the basis of the characteristics of the transmission channel and a predetermined transmission pattern, and for computing a power ratio of the power of said characteristics of the transmission channel and the power of the difference between the estimated received signal and the respective received signal;

means for comparing respective power ratios and for outputting the received signal corresponding to the maximum power ratio.

12. The diversity circuit of claim 11 wherein the characteristics of the transmission channel comprise a channel impulse response.

13. The diversity circuit of claim 11 wherein the means for outputting includes means for outputting the estimated characteristics of the transmission channel corresponding to the maximum power ratio.

14. The diversity circuit of claim 11 wherein said transmission channel characteristic estimation circuits and said error computing circuits operate in parallel.

* * * * *